United States Patent [19]

Maruyama et al.

[11] Patent Number: 5,149,740

[45] Date of Patent: Sep. 22, 1992

[54] RESIN COMPOSITION

[75] Inventors: Takashi Maruyama, Kobe; Yukio Mizuno, Niihama, both of Japan

[73] Assignee: Sumitomo Chemical Company, Limited, Osaka, Japan

[21] Appl. No.: 494,401

[22] Filed: Mar. 16, 1990

[30] Foreign Application Priority Data

Mar. 22, 1989 [JP] Japan .................................. 1-067480

[51] Int. Cl.⁵ ...................... C08L 27/24; C08L 53/02; C08L 71/12
[52] U.S. Cl. ...................................... 525/92; 525/72; 525/76; 525/905
[58] Field of Search ...................... 525/92, 72, 905, 76

[56] References Cited

U.S. PATENT DOCUMENTS

| | | | |
|---|---|---|---|
| 3,663,661 | 5/1972 | Katchman | 525/905 |
| 4,764,559 | 8/1988 | Yamauchi et al. | 525/92 |
| 4,863,997 | 9/1989 | Shibuya et al. | 525/92 |

FOREIGN PATENT DOCUMENTS

| | | |
|---|---|---|
| 0263678 | 10/1987 | European Pat. Off. . |
| 0274029 | 11/1987 | European Pat. Off. . |
| 0292153 | 5/1988 | European Pat. Off. . |
| 0302509 | 8/1988 | European Pat. Off. . |
| 42-7069 | 9/1967 | Japan . |
| 53-71158 | 6/1978 | Japan . |
| 54-88960 | 7/1979 | Japan . |
| 58-103556 | 6/1983 | Japan . |
| 58-103557 | 6/1983 | Japan . |
| 59-100159 | 6/1984 | Japan . |
| 60-76547 | 5/1985 | Japan . |

*Primary Examiner*—Jacob Ziegler
*Attorney, Agent, or Firm*—Stevens, Davis, Miller & Mosher

[57] ABSTRACT

The present invention provides a resin composition excellent in balance of mechanical strengths and superior in solvent resistance and processability which comprises:

(a) a polyolefin resin in an amount of 95-50% by weight, (b) a polyphenylene ether resin in an amount of 5-50% by weight, (c) a partially hydrogenated alkenyl aromatic compound-isoprene block copolymer in an amount of 1-7 parts by weight based on totally 100 parts by weight of the components (a) and (b), and (d) an ethylene-α-olefin copolymer elastomer in an amount of 5-30 parts by weight based on totally 100 parts by weight of the components (a) and (b).

This composition can be easily molded into articles excellent in balance of properties and having high uniformity and smoothness in appearance.

15 Claims, No Drawings

RESIN COMPOSITION

BACKGROUND OF THE INVENTION

The present invention relates to a resin composition which shows especially excellent balance of mechanical properties including mainly rigidity and is superior in processability, oil resistance and chemical resistance.

More particularly, it relates to a resin composition for injection molding, extrusion molding or blow molding which comprises a polyolefin, especially, a crystalline polyolefin, a polyphenylene ether resin, a partially hydrogenated alkenyl aromatic compound-isoprene block copolymer and an ethylene-α-olefin copolymer elastomer and is excellent in balance of mechanical properties including rigidity and heat resistance and superior in processability, organic solvent resistance and chemical resistance.

Polyolefins are superior in processability, toughness, water resistance, organic solvent resistance, chemical resistance, etc., low in specific gravity and inexpensive and hence have been widely used for production of various shaped articles and sheets. However, they suffer from the problem in heat resistance, which has hindered development of new uses thereof.

On the other hand, polyphenylene ether resins have excellent heat resistance, but has difficulties in processability and solvent resistance, which impose limitation on the scope of application. For improvement of processability and impact strength, blend of polyphenylene ether resin with a styrene resin is utilized, but this has defect in solvent resistance and is limited in scope of application. For example, the blend is not suitable in the field which requires resistance to oily solvents such as gasoline.

In an attempt to utilize the respective merits of these polyolefin and polyphenylene ether and offset their defects, various blend compositions have been proposed. For example, a composition has been proposed for improvement of processability and tensile strength (Japanese Patent Kokoku No. 42-7069). However, this composition does not necessarily suffice the relatively high level of mechanical strength which is required in industrial fields. Furthermore, for improving compatibility between polyolefin and polyphenylene ether resin to enhance mechanical strength, for example, a composition to which a styrene-butadiene block copolymer or its hydrogenated product is added (Japanese Pat. Kokai Nos. 53-71158, 54-88960 and 59-100159) and the above composition to which inorganic filler is added (Japanese Patent Kokai No. 58-103556) have been proposed. According to these proposals, processability and mechanical strength can be improved, but the organic solvent resistance possessed by polyolefin cannot be sufficiently exhibited for the reasons that amount of polyolefin added is small or matrix (continuous phase) comprises polyphenylene ether resin or composition of polyphenylene ether resin and styrene resin and the like. Moreover, there has been proposed a composition which comprises polyphenylene ether and a large amount (more than 20% by weight) of polyolefin to which are further added a diblock copolymer or radial teleblock copolymer composed of alkenyl aromatic compound and conjugated diene or hydrogenated polymers thereof as a compatibilizing agent (Japanese Patent Kokai Nos. 58-103557 and 60-76547). That is, it is said that a blend of a low-density polyethylene as polyolefin and polyphenylene ether resin has been improved in compatibility and can be improved in tensile characteristics and fragility by the addition of hydrogenated product of alkenyl aromatic compound - conjugated diene block copolymer. However, improvement only in compatibility is not enough to satisfy various properties required for common resins. For example, the composition disclosed in Japanese Patent Kokai No. 60-76547, namely, a resin composition comprising the three components of a polyphenylene ether, a low-density polyethylene as polyolefin, a component of large amount, and a hdyrogenated product of alkenyl aroamtic compound-conjugated diene block copolymer as a compatibilizing agent for the former two components has limitation in its use owing to its very low rigidity level. Among the above-mentioned combinations, resin compositions which contain polypropylene as polyolefin are somewhat improved in rigidity and heat reistance, but these are still not enough in practical use and further improvement has been desired.

The inventors have conducted intensive research in an attempt to make further improvement and to provide resin compositions which can satisfy balance of mechanical strength of relatively high level and solvent resistance and processability of relatively high level which are required in various uses such as fields of industrial parts.

As a result of investigation conducted by the inventors on polyphenylene ether resin, polyolefin and various additives, it has been found that a resin composition which shows excellent balance of mechanical properties and is superior in solvent resistance and processability can be obtained by adding a relatively small amount of a hydrogenated product of alkenyl aromatic compound-conjugated diene block copolymer having a specific structure and an ethylene-α-olefin copolymer elastomer to combiantion of polyphenylene ether resin and polyolefin, preferably crystalline polyolefin. Thus, the present invention has been accomplished.

SUMMARY OF THE INVENTION

The present invention is a resin composition which comprises:
(a) a polyolefin resin in an amount of 95-50% by weight,
(b) a polyphenylene ether resin in an amount of 50-40% by weight,
(c) a partially hydrogenated alkenyl aromatic compound-isoprene block copolymer in an amount of 1-7 parts by weight based on totally 100 parts by weight of the components (a) and (b), and
(d) an ethylene-α-olefin copolymer elastomer in an amount of 5-30 parts by weight based on totally 100 parts by weight of the components (a) and (b).

DESCRIPTION OF THE INVENTION

Component (a): Polyolefin resin

Polyolefins used in the present invention include, for example, homopolymers of α-olefins of 3 or more carbon atoms such as propylene, butene-1, pentene-1, hexene-1, 3-methylbutene-1, 4-methylpentene-1, heptene-1, and octene-1, copolymers of predominant amount of these α-olefins and α-olefin containing ethylene in the form of random copolymer, block copolymer and the like and mixtures thereof, copolymers such as random, block, and graft copolymers of a predominant amount of α-olefins of 3 or more carbon atoms and other unsaturated monomers, and oxidized, halogenated or sulfonated products of these polymers. Preferred are those which are at least partially crystalline.

As the other unsaturated monomers, there may be used unsaturated organic acids or derivatives thereof such as acrylic acid, methacrylic acid, maleic acid, itaconic acid, methyl acrylate, ethyl acrylate, methyl methacrylate, maleic anhydride, arylmaleic acid imide, and alkylmaleic acid imide; vinyl esters such as vinyl acetate and vinyl butyrate; aromatic vinyl compounds such as styrene and methylstyrene; vinyl silanes such as vinyltrimethylmethoxysilane; and γ-methacryloyloxypropyltrimethoxysilane; and non-conjugated dienes such as dicyclopentadiene, 4-ethylidene-2-norbornene, 4-methyl-1,4-hexadiene and 5-methyl-1,4-hexadiene.

In case of copolymers, these may comprise not only two of α-olefins or other monomers, but also more than two of them.

These polymers can be obtained by polymerization or modification according to known processes and besides, commercially available polymers may be optionally chosen and used. Combination of them can naturally be employed.

Among them, preferred are homopolymers of propylene, butene-1, 3-methylbutene-1 or 4-methylpentene-1 and copolymers containing a predominant amount of these monomers. Crystalline propylene polymers, namely, crystalline propylene homopolymer and crystalline propylene-ethylene block or random copolymer are especially preferred from the point of balance in mechanical properties.

Melt flow rate (MFR) (230° C., load 2.16 kg) of these crystalline propylene polymers is preferably within the range of 0.01–400, more preferably within the range of 0.15–60. If MFR is less than 0.01, the composition often has problems in processability and if it is more than 400, level of mechanical strength is low and this is not preferred.

Polyolefins include those which have come to have an MFR within the above range by allowing polyolefins having smaller MFR, namely, larger molecular weight to undergo change in molecular weight according to known method, for example, heat treatment in the presence or absence of free-radical initiator (organic or inorganic peroxides, organotin compounds, organic azo compounds, etc.) or heating and mechanical shearing at melt kneading.

Component (b): Polyphenylene ether resin

The polyphenylene ether resin used in the present invention has a recurring unit represented by the following formula:

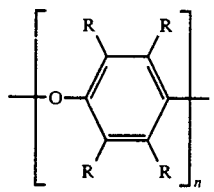

wherein the ether oxygen atom in one unit links to benzene nucleus in the next adjacent unit; n is at least 30; a plurality of R each represents a monovalent substituent selected from the group consisting of hydrogen, halogen, hydrocarbon group containing no tertiary α-carbon atom, halohydrocarbon group having at least two carbon atoms between halogen atom and phenyl nucleus, hydrocarbon oxy group and halohydrocarbon oxy group having at least two carbon atoms between halogen atom and phenyl nucleus.

Typical examples of polyphenylene ethers are the following and analogues thereof.
Poly(2,6-dimethyl-1,4-phenylene) ether,
Poly(2,6-diethyl-1,4-phenylene) ether,
Poly(2-methyl-6-ethyl-1,4-phenylene) ether,
Poly(2-methyl-6-propyl-1,4-phenylene) ether,
Poly(2,6-dipropyl-1,4-phenylene) ether,
Poly(2-ethyl-6-propyl-1,4-phenylene) ether,
Poly(2,6-dibutyl-1,4-phenylene) ether,
Poly(2,6-dipropenyl-1,4-phenylene) ether,
Poly(2,6-dilauryl-1,4-phenylene) ether,
Poly(2,6-diphenyl-1,4-phenylene) ether,
Poly(2,6-dimethoxy-1,4-phenylene) ether,
Pcly(2,6-diethoxy-1,4-phenylene) ether,
Poly(2-methoxy-6-ethoxy-1,4-phenylene) ether,
Poly(2-ethyl-6-stearyloxy-1,4-phenylene) ether,
Poly(2,6-dichloro-1,4-phenylene) ether,
Poly(2-methyl-6-phenyl-1,4-phenylene) ether,
Poly(2,6-dibenzyl-1,4-phenylene) ether,
Poly(2-ethoxy-1,4-phenylene) ether,
Poly(2-chloro-1,4-phenylene) ether,
Poly(2,5-dibromo-1,4-phenylene) ether.

Further examples are copolymers such as copolymer of 2,6-dimethylphenol and 2,3,6-trimethylphenol, copolymer of 2,6-dimethylphenol and 2,3,5,6-tetramethylphenol and copolymer of 2,6-diethylphenol and 2,3,6-trimethylphenol.

The polyphenylene ethers used in the present invention further include modified polyphenylene ethers such as polyphenylene ethers defined by the above-mentioned formula on which a styrene monomer (e.g., styrene, p-methylstyrene, and α-methylstyrene) is grafted.

Processes for preparation of these polyphenylene ethers have been known as disclosed, for example, in U.S. Pat. Nos. 3306874, 3306875, 3257357, and 3257358, Japanese Pat. Kokoku No. 52-17880 and Japanese Pat. Kokai No. 50-51197.

Polyphenylene ethers preferred for attaining the objects of the present invention are those which have alkyl substituents in the two ortho positions in respect to the ether oxygen atom and copolymers of 2,6-dialkylphenol and 2,3,6-trialkylphenol.

Among them, polymers of 2,6-dimethylphenol are especially preferred. Further, molecular weight of the polyphenylene ethers in terms of intrinsic viscosity measured in chloroform at 25° C. is preferably within the range of 0.2-0.7 dl/g, more preferably within the range of 0.25-0.6 dl/g and further preferably within the range of 0.3-0.55 dl/g. If the intrinsic viscosity is less than 0.2 dl/g, mechanical strength of composition is insufficient and if more than 0.7 dl/g, processability of the composition is deteriorated.

Furthermore, polyphenylene ethers, may be replaced with styrene resins such as polystyrene, high-impact polystyrene reinforced with various rubbers and ABS resin in an amount of less than half of the weight of polyphenylene ethers.

Component (c): Partially hydrogenated alkenyl aromatic compound-isoprene copolymer The partially hydrogenated alkenyl aromatic compound-isoprene block copolymer used in the present invention is an alkenyl aromatic compound-isoprene block copolymer which has a structure containing at least one chain block "A" originating from the alkenyl aromatic compound and at least one chain block "B" originating from the isoprene and in which content of aliphatic unsaturated group in the block B is reduced by hydrogenation. Arrangement of block A and block B includes linear structure and branched structure, so-called radial teleblock structure.

Distribution of monomer components is not critical and may be uniform or ununiform and furthermore may be tapered with icrease or decrease in the amount of monomer components along molecular chain. Therefore, respective molecular weights of block A and block B may be the same or different. Moreover, a part of these structures may contain random chain originating from random copolymer portion of alkenyl aromatic compound and isoprene. Among them, preferred are linear structures such as diblock (A-B blocks), triblock (A-B-A blocks, B-A-B blocks), tetrablock (A-B-A-B blocks), pentablock (A-B-A-B-A blocks, B-A-B-A-B blocks) and those which have totally 6 or more A and B blocks. More preferred are diblock, triblock and tetrablock structures and A-B diblock structure is especially preferred.

The alkenyl aromatic compound which constitutes block A has the chemical structure represented by the following formula.

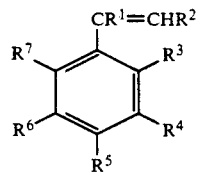

wherein $R^1$ and $R^2$ each represents hydrogen atom or a lower alkyl or alkenyl group of 1-6 carbon atoms, $R^3$ and $R^4$ each represents a hydrogen atom, a lower alkyl group of 1-6 carbon atoms, a chlorine atom or a bromine atom, and $R^5$, $R^6$ and $R^7$ each represents a hydrogen atom or a lower alkyl or alkenyl group of 1-6 carbon atoms and $R^6$ and $R^7$ may link together with a hydrocarbyl group to form a naphthyl group.

Examples of the alkenyl aromatic compounds include styrene, p-methylstyrene, α-methylstyrene, vinylxylene, vinyltoluene, vinylnaphthalene, divinylbenzene, bromostyrene and chlorostyrene and these may also be used in combination. Among them, styrene, α-methylstyrene, p-methylstyrene, vinyltoluene, and vinylxylene are preferred and styrene is more preferred.

Proportion of the recurring unit originating from alkenyl aromatic compound in the partially hydrogenated alkenyl aromatic compound-isoprene block copolymer (c) is preferably more than 20% by weight and at most 80% by weight, more preferably 25-65% by weight. If the proportion is more than 80% by weight, impact strength of resin composition is deteriorated to unsatisfactory level and if it is 20% by weight or less, rigidity level and heat resistance of resin composition are insufficient and the objects of the present invention cannot be attained.

In the aliphatic chain portion of the block copolymer (c), proportion of unsaturated bond remaining without being hydrogenated is preferably 50% by weight or less, more preferably 20% by weight or less, further preferably 10% by weight or less. Further, about 25% by weight or less of aromatic unsaturated bond originating from alkenyl aromatic compound may be hydrogenated.

The hydrogenated block copolymer (c) has a number-average molecular weight (obtained according to polystyrene conversion method from values measured by gel permeation chromatography) of preferably 5,000–500,000 g/mol, more preferably 10,000–300,000 g/mol, still further preferably 30,000–200,000, especially 45,000–150,000 g/mol. If the number-average molecular weight is more than 500,000 g/mol or less than 5,000 g/mol, production cost is apt to increase.

Measurement by gel permeation chromatography was carried out by using monodispersed polystyrene as standard material in obtaining relation between elution time and molecular weight. The average molecular weight was in terms of polystyrene.

Molecular weight distribution of the hydrogenated block copolymer (c) can be measured by the above gel permeation chromatography, but preferred molecular weight distribution is not limited and besides so-called value Q obtained by dividing value of weight-average molecular weight by that of number-average moelcular weight may be within any range. Moreover, the molecular weight distribution may have not only one peak, but also two or more peaks. Moreover, the block copolymer (c) may be such that containing, in addition to the component of peak of main dispersion, a small amount of components of higher or lower molecular weight than that of the component of the peak of main dispersion, in other words, having shape of molecular weight distribution comprising a peak of main dispersion having the foot descending by a gradual slope.

The alkenyl aromatic chain block (block A) and the hydrogenated isoprene chain block (block B) in the hydrogenated block copolymer (c) may be of any molecular weight as far as it satisfies the above-mentioned number-average moelcular weight and may be of any combinations.

These hydrogenated block copolymers (c) have hydrogenated isoprene polymer chain portion and some of them show crystallinity originating from this chain. It is considered that this is because the hydrogenated isoprene polymer chain has a molecular structure similar to polyolefin. Crystallinity of the hydrogenated block copolymer (c) can be measured by differential scanning calorimeter (DSC).

The hydrogenated block copolymers (c) usable in the present invention may be of any crystallinity.

The hydrogenated block copolymers (c) may have any glass transistion temperatures based on the hydrogenated isoprene polymer chain portion.

The glass transition temperature can be measured by the above-mentioned DSC method or based on change of viscoelasticity with temperature measured by mechanical spectrometer or the like.

Many processes have been proposed for producing alkenyl aromatic compound-isoprene block copolymers. Typical processes are disclosed, for example, in Japanese Pat. Kokoku No. 40-23798, U.S. Pat. Nos. 3595942 and 4090996. According to these processes, block copolymerization is carried out in an inert solvent such as cyclohexane using lithium catalyst, Ziegler catalyst or the like. One of these block copolymers is supplied from Japan Synthetic Rubber Co., Ltd. by the trademark to "TR2400". Hydrogenation treatment of these block copolymers is carried out by hydrogenation in an inert solvent such as cyclohexane in the presence of hydrogenation catalyst according to the processes disclosed in Japanese Pat. Kokoku Nos. 42-8704, 43-6636 and 46-20814.

As compounds similar to the partially hydrogenated alkenyl aromatic compound-isoprene block copolymer, there are known partially hydrogenated alkenyl aromatic compound-butadiene block copolymers, specifically, hydrogenated styrene-butadiene block copolymers. However, when these copolymers are used, compatibility between polyolefin resin and polyphenylene ether resin is somewhat insufficient and besides, heat resistance such as heat distortion temperature is considerably inferior and the objects of the present invention cannot be attained.

Component (d): Ethylene-α-olefin copolymer elastomer

Ethylene-α-olefin copolymer used in the present invention has an ethylene content of 30-93 mol%, preferably 35-90 mol%. If the ethylene content is more than 93 mol% or less than 30 mol%, the ethylene-α-olefin copolymer becomes highly crystalline and impact resistance of composition cannot be sufficiently improved. Furthermore, melt flow rate [MFR, measured at 190° C. under load of 2160 g (ASTM D-1238 E)]of the ethylene-α-olefin copolymer is desirably within the range of 0.1-50 g/10 min, more preferably within the range of 0.2-20 g/10 min. If MFR is less than 0.1 g/10 min or more than 50 g/10 min, the effect to improve impact resistance tends to decrease.

Density of the ethylene-α-olefin copolymer is preferably 0.90 g/cm3 or less, more preferably 0.85-0.89 g/cm$^3$. Furthermore, the ethylene-α-olefin copolymer is suitably low-crystalline or non-crystalline and its crystallinity is usually 0-50%, preferably 0-40%.

Unit of α-olefin component which constitutes the ethylene-α-olefin copolymer is an α-olefin of 3-18 carbon atoms. Examples thereof are propylene, 1-butene, 1-hexene, 4-methyl-1-pentene and 1-decene. These may be used singly or as mixtures of two or more of them. This ethylene-a-olefin copolymer may further contain diene component in an amount of 5 mole% or less.

Typical examples of the diene component are dicyclopentadiene, ethylidene norbornene and isopropylidene norbornene.

Compositional ratio of components

Content of polyolefin component (a) in the resin composition of the present invention is preferably 95-50% by weight, more preferably 95-55% by weight, especially preferably 95-60% by weight when total amount of polyolefin (a) and polyphenylene ether resin (b) is assumed to be 100% by weight.

If the content is less than 50% by weight, composition is insufficient in organic solvent resistance and if it is more than 95% by weight, heat resistance is in unsatisfactory level and the objects of the present invention cannot be attained.

Similarly, content of polyphenylene ether resin, component (b), is preferably 5-50% by weight, more preferably 5-45% by weight and especially preferably 5-45% by weight when total amount of component (a) and component (b) is assumed to be 100% by weight. If it is less than 5% by weight, level of rigidity is insufficient and if it is more than 50% by weight, organic solvent resitance is insufficient.

Content of the partially hydrogenated alkenyl aromatic compound-isoprene block copolymer, the component (c), is preferably 1-7 parts by weight, more preferably 1-5 parts by weight, especially preferably 1-4 parts by weight based on totally 100 parts by weight of component (a) and component (b). If it is less than 1 part by weight, compatibility between polyphenylene ether resin and polyolefin resin is inferior and mechanical strength such as impact strength is insufficient and if it is more than 7 parts by weight, thermal properties such as heat distortion temperature are deteriorated.

Content of the ethylene-α-olefin copolymer, component (d), is preferably 5-30 parts by weight, preferably 7-25 parts by weight based on totally 100 parts by weight of component (a) and component (b). If it is less than 5 parts by weight, level of impact strength is insufficient and if it is more than 30 parts by weight, level of rigidity is unsatisfactory and the object of the present invention cannot be attained.

The resin composition of the present invention may contain, in addition to the above components, auxiliary components as far as the effects of the present invention are not damaged. Examples of these components are antioxidant, weathering modifier, nucleating agent for polyolefin, slip agent, inorganic or organic fillers and reinforcing agent, flame retardant, various colorants, antistatic agent, releasing agent, and a small amount of free-radical initiator (organic peroxides, etc.) for molecular weight regulation of polyolefins.

Furthermore, plasticizer such as triphenyl phosphate used for polyphenylene resin, and furthermore, fillers such as glass fiber, wollastonite, potassium titanate, whisker, mica, talc, and calcium carbonate are effective for improvement of balance of properties such as rigidity and improvement of processability, dimensional accuracy, and dimensional stability.

Method of blending

As method of blending for obtaining the resin composition of the present invention, various methods can be employed which are generally used for blending of resins per se; resins and stabilizer or colorant; resins and filler; and the like. For example, respective components in the form of powder or particle are made into a homogeneously dispersed mixture by Henschel mixer, super mixer, ribbon blender, V blender, etc. Then, the mixture is melt kneaded by twin-screw extruder, single-screw extruder, roll, Banbury mixer, blast mill, melt kneader with Brabender Plastograph, etc. Melt kneading temperature is usually 200°-350° C. The thus obtained resin composition can be extruded into pellets after melt kneading. Application of the resin composition of the present invention:

The resin composition of the present invention can be easily molded by molding methods generally applied to thermopalstic resins, nemely, injection molding, extrusion molding, blow molding, etc., among which injection molding is most preferred. Because of its good mechanical properties, the composition is suitable for automobile parts, specifically, exterior trim parts such as bumper, door, door panel, fender, ornament, emblem, wheel cover, engine hood, roof, and spoiler, internal trim parts such as instrument panel, console box, and trim, exterior parts of electrical equipments such as television, refrigerator, and so-called office automation equipments.

EXAMPLE

The following nonlimiting examples and comparative examples explain the present invention. Methods for measurement and evaluation:

In the following examples and comparative examples, the properties were measured and evaluated under the following conditions.

(1) MFR (for indication of flowability)

MFR of polyolefin was measured in accordance with JIS K 7210-1975.

(2) Flexural modulus (for indication of rigidity)

This was measured in accordance with ISO R 178-1974 Procedure 12 (JIS K 7203) using Instron tester.

(3) Izod impact strength

This was measured in accordance with ISO R 180-1969 (JIS K 7110) (notched Izod imapct strength) using Izod impact tester manufactured by Toyo Seiki Seisakusho Co., Ltd.

(4) heat distortion temperature (for indication of heat resistance)

This was measured in accordance with ISO R 75-1958 Method A (JIS K 7207-1974 A) using an injection molded test piece subjected to annealing treatment at 100° C. for 30 minutes.

EXAMPLE 1

A propylene homopolymer (SUMITOMO NOBRENE D-501 manufactured by Sumitomo Chemical Co., Ltd.), poly-(2,6-dimethylphenylene) ether (manufactured by Sumitomo Chemical Co., Ltd.), a partially hydrogenated styreneisoprene block copolymer (hereinafter referred to as "hydrogenated SI") (KRATON G1701X manufactured by Shell Chemical Co.), and an ethylene-propylene copolymer elastomer (ESPRENE E-120 manufactured by Sumitomo Chemical Co., Ltd.) were mixed at a mixing ratio as shown in Table 1 by a super mixer. The resulting mixture was melt kneaded by a twin-screw extruder (TEM-50 manufactured by Toshiba Machine Co., Ltd.) at 260°-280° C. to obtain pellets Properties of test piece made from the pellets were measured and the results are shown in Table 1.

COMPARATIVE EXAMPLE 1

In the same manner as in Example 1, pellets were prepared from a composition of propylene homopolymer, poly-(2,6-dimethylphenylene) ether and hydrogenated styrene-isoprene block copolymer and measurement of properties was conducted. The results are shown in Table 1.

As is clear from comparison of the results of Example 1 with those of Comparative Example 1, the composition obtained from only polypropylene, poly(2,6-dimethylphenylene) ether and hydrogenated styreneisoprene block copolymer is low in both the heat distortion temperature and flexural modulus and the composition of the present invention is excellent in balance of properties.

COMPARATIVE EXAMPLE 2

Pellets were prepared in the same manner as in Example 1 except that a hydrogenated styrene-butadiene block copolymer (hereinafter referred to as "hydrogenated SB") was used in place of the hydrogenated styreneisoprene block copolymer. Measurement of properties was conducted to obtain the results as shown in Table 1.

As can be seen from comparison of the results of Example 1 with those of Comparative Example 2, when similar to hydrogentated styrene-isoprene block copolymer was used in place of the latter, the resulting composition is low in all of heat distortion temperature, flexural modulus and impact strength while the composition of the present invention is excellent.

COMPARATIVE EXAMPLE 3

Pellets were prepared in the same manner as in Example 1 except that the hydrogenated styrene-isoprene block copolymer was not used and measurement of properties was conducted to obtain the results as shown in Table 1.

As can be seen from comparison of the results of Example 1 with those of Comparative Example 3, when the hydrogenated styrene-isoprene block copolymer is not used, impact strength is extemely low.

TABLE 1

| | | Example 1 | Comparative Example 1 | Comparative Example 2 | Comparative Example 3 |
|---|---|---|---|---|---|
| Resin composition | | | | | |
| Polypropylene | Kind | Homopolymer | Homopolymer | Homopolymer | Homopolymer |
| | MFR (g/10 min) | 0.4 | 0.4 | 0.4 | 0.4 |
| | Amount (part by weight) | 70 | 70 | 70 | 70 |
| Polyphenylene ether | Intrinsic viscosity (dl/g) | 0.35 | 0.35 | 0.35 | 0.35 |
| | Amount (part by weight) | 30 | 30 | 30 | 30 |
| Hydrogenated styrene-conjugated diene block copolymer | Kind | Hydrogenated SI | Hydrogenated SI | Hydrogenated SB | — |
| | Amount (part by weight) | 3 | 18 | 3 | — |
| Ethylene-propylene copolymer elastomer | Amount (part by weight) | 15 | — | 15 | 15 |
| Properties of composition | | | | | |
| Flexural modulus (23° C., kg/cm$^2$) | | 11,300 | 7,600 | 8,900 | 12,300 |
| Heat distortion temperature (4.6 kg load, °C.) | | 138 | 118 | 121 | 143 |
| Izod impact strength | 23° C. | 33 | 31 | 19 | 3 |
| | −30° C. | 11 | 9 | 8 | 1 |

TABLE 1-continued

|  | Example 1 | Comparative Example 1 | Comparative Example 2 | Comparative Example 3 |
|---|---|---|---|---|
| (kg · cm/cm) | | | | |

EXAMPLES 2-5

Pellets were prepared in the same manner as in Example 1 except that mixing ratio of the components was as shown in Table 2 and properties were evaluated. The results are shown in Table 2. Components used in Table 2 are as follows:

Polypropylene

Homopolymer: SUMITOMO NOBRENE D-501 (trademark) manufactured by Sumitomo Chemical Co., Ltd.

Random copolymer: Propylene-ethylene random copolymer [SUMITOMO NOBRENE S-131 (trademark) manufactured by Sumitomo Chemical Co., Ltd.]

Block copolymer: Propylene-ethylene block copolymer [SUMITOMO NOBRENE AS-171A (trademark)manufactured by Sumitomo Chemical Co., Ltd.]

Polyphenylene ether; Poly-(2,6-dimethylphenylene) ether manufactured by Sumitomo Chemical Co., Ltd.]

Hydrogenated SI: KRATON G-1701 (trademark) manufactured by Shell Chemical Co.

ETHYLENE-α-olefin copolymer elastomer

EPR(1): Ethylene-propylene copolymer (ESPRENE E-120 manufactured by Sumitomo Chemical Co., Ltd.)

EPR-(2): Ethylene-propylene-ethylidene norbornene copolymer (ESPRENE E-501A manufactured by Sumitomo Chemical Co., Ltd.)

EB: Ethylene-butene-1 copolymer [ethylene/butene=about 8/2 (weight ratio)]

molding, extrusion molding and blow molding. The resulting articles are very good in balance of properties such as impack resistance, heat resistance and solvent resistance and are excellent in uniformity and smoothness of surface.

What is claimed is:

1. A resin composition which comprises:
   (a) a polyolefin resin in an amount of 95-50% by weight,
   (b) a polyphenylene ether resin in an amount of 5-50% by weight,
   (c) a partially hydrogenated alkenyl aromatic compound-isoprene block copolymer in an amount of 1-4 parts by weight based on totally 100 parts by weight of the components (a) and (b), and
   (d) an ethylene-α-olefin copolymer elastomer in an amount of 5-30 parts by weight based on totally 100 parts by weight of the components (a) and (b).

2. A resin composition according to claim 1, wherein the polyolefin resin is a homopolymer of an α-olefin of 3 or more carbon atoms, copolymer of an α-olefin of 3 or more carbon atoms with other α-olefin, a mixture thereof, copolymer of an α-olefin of 3 or more carbon atoms with other unsaturated monomer or oxidized, halogenated or sulfonated product of the above polymer.

3. A resin composition according to claim 1, wherein the polyolefin resin is a crystalline propylene homopolymer or copolymer.

4. A resin composition according to claim 3, wherein the crystalline propylene homopolymer or copolymer has a melt flow rate of 0.01-14 400 g/10 min.

5. A resin composition according to claim 1, wherein the polyphenylene ether resin has recurring unit represented by the following formula:

TABLE 2

|  |  | Example 2 | Example 3 | Example 4 | Example 5 |
|---|---|---|---|---|---|
| Resin Composition | | | | | |
| Polypropylene | Kind | Homopolymer | Random copolymer | Block copolymer | Homopolymer |
|  | Amount (part by weight) | 60 | 90 | 80 | 75 |
| Polyphenylene ether | Intrinsic viscosity (dl/g) | 0.35 | 0.45 | 0.40 | 0.40 |
|  | Amount (part by weight) | 40 | 10 | 20 | 25 |
| Hydrogenated SI | Amount (part by weight) | 3 | 5 | 3 | 3 |
| Ethylene-α-olefin copolymer | Kind | EPR-(2) | EPR-(1) | EPR-(1) | EB |
|  | Amount (part by weight) | 20 | 10 | 18 | 17 |
| Properties of Composition | | | | | |
| Flexural modulus (23° C., kg/cm$^2$) | | 12,300 | 10,200 | 11,800 | 13,200 |
| Heat distortion temperature (4.6 kg load, °C.) | | 141 | 133 | 135 | 139 |
| Izod impact strength (kg · cm/cm) | 23° C. | 36 | 32 | 41 | 35 |
|  | −30° C. | 13 | 11 | 13 | 12 |

As explained above, the resin composition of the present invention shows excellent balance of mechanical strength and is good in solvent reistance and proecssability.

The resin composition can be easily processed into shaped articles by molding methods applied to general thermoplastic resin compositions such as injection

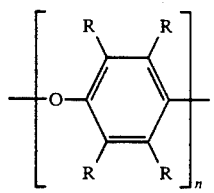

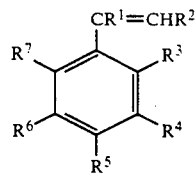

wherein ether oxygen atom links to benzene nucleus in the next adjacent unit, n is at least 30, a plurality of R each represents a hydrogen atom, a halogen atom, a hydrocarbon group containing no tertiary -carbon atom, a hol-hydrocarbon group having at least two carbon atoms between halogen atom and phenyl nucleus, a hydrocarbon oxy group, or a halohydrocarbon oxy group having at least tow carbon atoms between halogen atom and phenyl nucleus.

6. A resin composition according to claim 1, wherein the polyphenylene ether resin has an intrinsic viscosity of 0.2-0.7 dl/g.

7. A resin composition according to claim 1, wherein the partially hydrogenated alkenyl aromatic compound-isoprene block copolymer is an alkenyl aromatic compound-isoprene block copolymer which has a structure containing at least one chain block originating from the alkenyl aromatic compound and at least one chain block originating from the isoprene and in which content of aliphatic unsaturated group in the block originating from the isoprene is reduced by hydrogenation.

8. A resin composition according to claim 7, wherein the alkenyl aromatic compound has the chemical structure represented by the following formula:

wherein $R^1$ and $R^2$ each represents hydrogen atom or a lower alkyl or alkenyl group of 1-6 carbon atoms, $R^3$ and $R^4$ each represents a hydrogen atom, a lower alkyl group of 1-6 carbon atoms, a chlorine atom or a bromine atom, and $R^5$, $R^6$ and $R^7$ each represents a hydrogen atom or a lower alkyl or alkenyl group of 1-6 carbon atoms and $R^6$ and $R^7$ may link together with a hydrocarbyl group to form a naphthyl group together with the benzen ring.

9. A resin composition according to claim 8 is styrene.

10. A resin composition according to claim 7, wherein content of the block originating from the alkenyl aromatic compound in the block copolymer (c) is higher than 20% by weight and at most 80% by weight.

11. A resin composition according to claim 7, wherein content of unsaturated bond originating from aliphatic chain and remaining without hydrogenation in block copolymer (c) is 50% by weight or less.

12. A resin composition according to claim 1, wherein the block copolymer (c) has a number-average molecular weight of 5,000-500,000 g/mol.

13. a resin composition according to claim 1, wherein the ethylene-α-olefin copolymer has an ethylene content of 30-93 mol%.

14. A resin composition according to claim 1, wherein the ethylene-α-olefin copolymer has a melt flow rate of 0.1-50 g/10 min.

15. A resin composition according to claim 1, wherein the ethylene-α-olefin copolymer has a density of 0.90 g/cm³ or less.

* * * * *